United States Patent Office 3,172,776

Patented Mar. 9, 1965

3,172,776

PROCESS OF MAKING MAGNETIC TAPE

William A. Manly, Jr., Santa Clara, Calif., assignor to Ampex Corporation, Redwood, Calif., a corporation of California No Drawing. Filed Apr. 1, 1963, Ser. No. 269,720
1 Claim. (Cl. 117—93.2)

This invention relates to magnetic recording media wherein a coating comprising magnetic particles dispersed in a resin is applied to a base. Although such magnetic recording media can be in the form of rods, discs, cylinders and the like, by far the most common form is that wherein an elongated flexible tape serves as the base. Therefore, the invention will be described in terms of forming an elongated tape although it will be apparent from the description which follows that any form of magnetic recording media can be manufactured using the techniques of the present invention.

In the making of tapes, it is known that the quality of the tape can be substantially increased if the magnetic particles are aligned in such a manner that their magnetic axes lie in the direction of recording and reproduction. For most tapes, such as those used to record sound or data, this is in a direction lengthwise to the tape, while in other tapes, such as video tapes which are scanned normal to the length of the tape, this would be crosswise on the tape. The magnetic axis herein referred to is sometimes known as the "easy" magnet axis.

Heretofore, the magnetic particles employed in the making of tape have an inherent shape anisotropy. This is ordinarily due to the shape of the particles since the usual particles are in the gamma form of magnetic iron oxide ($Fe_2O_3$) and usually have an acicular shape.

Recently, a technique has been devised by others whereby extremely finely divided metal particles suitable for use in tape making can be formed. According to this method a metal carbonyl dissolved in an organic solvent is brought into contact with a polymer mixture producing a dispersion of the finely divided metal particles, each of which is encapsulated in a plastic. A typical example of such a dispersion comprises copolymerized methyl methacrylate, ethyl acrylate, and vinyl pyrrolidone having dispersed therein cobalt particles having a size of 350 to 400 A. Other polymer systems can be used, particularly those wherein the polymer contains reactive hydroxyl radicals or other radicals which are capable of further reaction with other resins to produce tough, adherent coatings when the finely dispersed particles are used to coat a tape base.

Such finely dispersed metal particles have no inherent magnetic shape anisotropy so that one would ordinarily assume that no useful result could be obtained by the use of the normal magnetic alignment techniques heretofore common in the tape making art. In accordance with the present invention, it has been found that such particles can be aligned and that tapes of increased efficiency can be made by such alignment techniques.

Dispersion of colloidal particles such as the cobalt particles described above tend to form in small chains. The exact mechanism of this is not understood, but is probably caused by the mechanism of adhesion of the polymeric coating of the individual particles or adhesion of the particles themselves due to magnetic forces between the particles.

In accordance with the present invention, it has been found that such colloidal magnetic particles possessing no inherent shape anisotropy can be aligned by the application of an interrupted magnetic field. The interrupted magnetic field can be either in the form of a pulsed, unidirectional field or in the form of a reversing field such as that produced by ordinary alternating current.

The field may be applied in the form of one or more unidirectional pulses which have a peak value close to, but less than, the value of the field required to magnetically saturate the magnetic material of which the particles are made. Preferably, the pulse shape is such that the rise and fall times are a least as small as those caused by critically damped resonant circuits and the pulse length is no more than necessary to rotate the chains to the desired position. Preferably several pulses are used, each of which is weaker than that necessary to rotate the chains to the desired position since in this way the possibility of translation of the chains is minimized. In one typical example, utilizing particles 300 A. in size with chains which consisted of ten to twenty particles (this was determined on an electron microscope), the pulse length was 10 milliseconds and 15 pulses were necessary to achieve the desired orientation. It is important that the magnetic field be as homogenous as possible since strong magnetic space gradients within the field will tend to cause the chains to migrate and agglomerate, which is undesirable.

Instead of applying pulses, the field may be applied in the form of a sine wave wherein the direction of the field reverses for each succeeding half cycle. Here again the peak field amplitude is less than the field required to magnetically saturate the materials with which the particles are made and is also not large enough to "flip" or reverse the magnetization of the chain from end to end. Surprisingly enough, when alternating current is used, the direction of orientation is transverse to the direction of the applied field which is highly desirable in the case of video tapes which are scanned from side to side. The exact reason for the formation of the transverse orientation is not clearly understood.

In carrying out the present invention, a miniature knife coater was used which fit inside of a Helmholtz coil pair. The Helmholtz coils were four inches in diameter and each had 1000 turns of No. 14 wire. The coils had a measured inductance of 90 millihenries each and a D.C. resistance of 14 ohms each. The coils were wired so they could be placed in either series or parallel and when series-connected they had a field of 177 gausses per ampere while parallel-connected field was 89 gausses per ampere. A power supply was used which was capable of giving single or multiple D.C. pulses or of applying A.C. to the coils. The power supply could be varied so that fields of from 0 to 3800 gausses could be achieved. When pulsed, the current pulses were from 50 to 60 amperes and the duration of the pulses was 10 milliseconds. When multiple pulses were employed there was about one second between pulses. The following two samples were oriented using this equipment. Sample 1 was considered a high metal content material while Sample 2 was a low metal content material. In the description of the samples, the term "terpolymer" refers to a copolymer of methyl methacrylate, ethyl acrylate and vinyl pyrrolidone.

| | Sample 1 | Sample 2 |
|---|---|---|
| Solids Only: | *Percent* | *Percent* |
| Cobalt by weight | 93.0 | 69.4 |
| Terpolymer by weight | 7.0 | 30.6 |
| Overall Composition: | | |
| Total Solids by weight | 22.0 | 6.0 |
| Toluene by weight | 78.0 | 94.0 |

Since the specific gravities of cobalt, terpolymer and toluene are 8.9 gm./cc., 0.98 gm./cc. and 0.87 gm./cc.

respectively, the percentages by volume of the wet and dry material are as follows:

| | Sample 1 | Sample 2 |
|---|---|---|
| | *Percent* | *Percent* |
| Solids Only: | | |
| Cobalt by weight | 59.4 | 20.0 |
| Terpolymer by weight | 40.6 | 80.0 |
| Overall Composition: | | |
| Cobalt | 2.5 | 0.4 |
| Terpolymer | 1.7 | 1.7 |
| Toluene | 95.8 | 97.9 |

*Example I*

A tape was made utilizing the material of Sample 1. The miniature knife coater previously described was employed and a single pulse was applied as soon as possible after the coating drawdown was made. This involved a time lapse of from ½ to 1 second between drawdown and the pulse. The coating was then dried and the remanence ratio was determined. The remanence ratio was determined by first magnetizing the finished tape in the direction of the orienting field and passing the tape over a magnetic reproducing head which picks up a signal voltage from the tape. The tape is then magnetized in a direction transverse to the orientation direction and again passed over the pick up head. The ratio of the output voltages from the head in the two directions is the ratio of the remanences. In Example I, the peak orienting field utilized was from about 800 to 3,600 gausses and ratios of remanences of slightly above 1.3 were obtained. The ratio of remanences was not necessarily proportional to the peak orienting field strength.

*Example II*

The process of Example I was repeated except that the Sample 2 material was used. Again the peak orienting filed was varied from about 800 to 3,800 gausses and values slightly higher than 1.3 were obtained for the ratio of remanences.

*Example III*

Sample 1 material was used and the process of Example I essentially repeated except that one pulse per second was employed all the time the tape was drying. In different runs the field strength was varied from about 1000 to 2,700 gausses. The drying time was about one minute. Ratios of remanences as high as 1.65 were obtained.

*Example IV*

Example III was repeated except that Sample 2 material was utilized. The field strengths were varied within the limits set forth in Example III. Ratios of remanences as high as 1.6 were obtained.

*Example V*

Sample 1 type material was utilized and a 60 cycle A.C. field was maintained on the tape for about one minute after coating, i.e. until the tape was substantially dry. Fields from about 100 to 1,200 gausses were employed. Here the orientation was in the transverse direction and ratios of remanences as low as 0.7 were obtained.

*Example VI*

The process of Example V was repeated with Sample 2 material and substantially the same results obtained.

What is claimed is:

The process of making a magnetic recording medium, said medium comprising a base and a coating of colloidal magnetic particles dispersed in a resin, said magnetic particles consisting of metallic cobalt having a particle size of about 300 A. and being formed into chains of 10 to 20 particles, comprising applying a fluid mixture of the resin and the cobalt particles to a base, immediately imposing an interrupted unidirectional magnetic field to the thus coated base, and simultaneously drying the mixture to form thereon a dry coating of oriented particles dispersed in said resin, said field being applied in pulses the length of each pulse being about 10 milliseconds with about 1 second between each pulse.

References Cited by the Examiner

UNITED STATES PATENTS

| | | | |
|---|---|---|---|
| 2,418,479 | 4/47 | Pratt et al. | |
| 2,796,359 | 6/57 | Speed. | |
| 3,001,891 | 9/61 | Stoller | 117—93.2 |
| 3,013,976 | 12/61 | Stuijts et al. | 252—62.5 |
| 3,023,166 | 2/62 | Duinker et al. | |
| 3,026,215 | 3/62 | Fukuda et al. | 117—93.2 |
| 3,065,105 | 11/62 | Pohm | 117—93.2 |
| 3,092,510 | 6/63 | Edelman | 117—93.2 |
| 3,095,319 | 6/63 | Williams. | |

WILLIAM D. MARTIN, *Primary Examiner.*

MURRAY KATZ, *Examiner.*